March 10, 1942.                R. REPPERT ET AL                2,276,092
                        CLOSURE FOR BATTERY BOX COVERS
                         Original Filed April 9, 1940
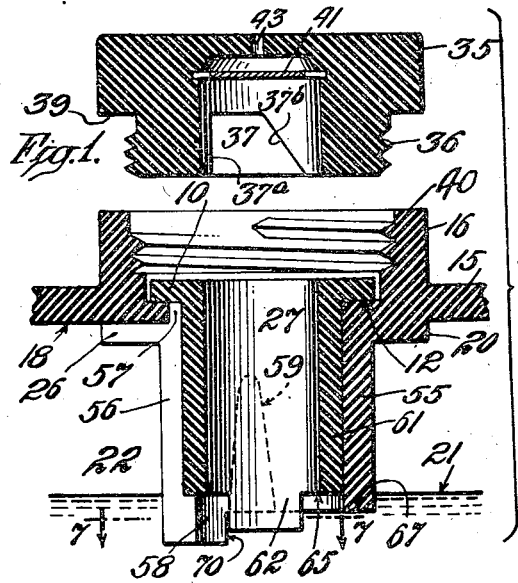
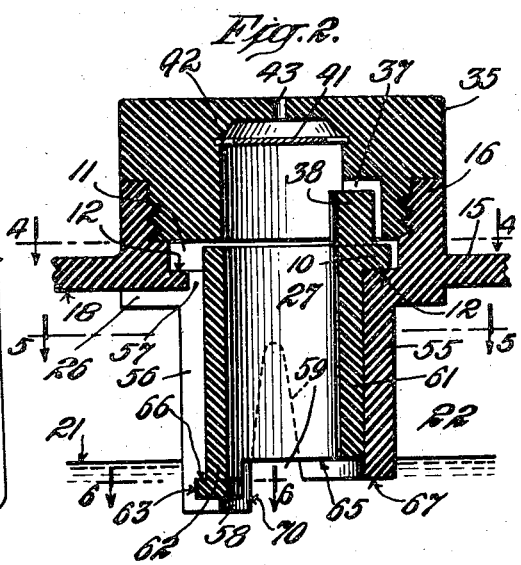
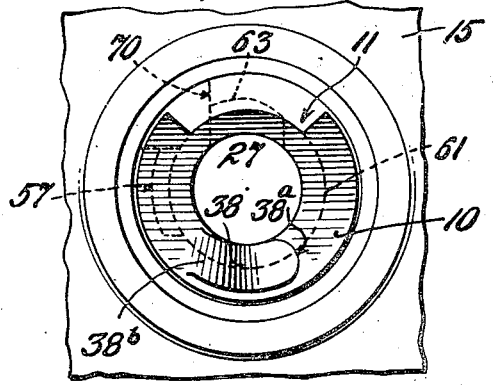
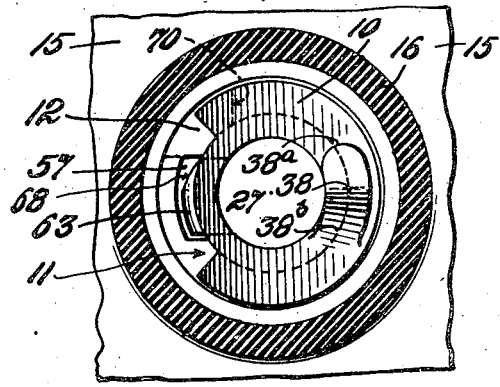
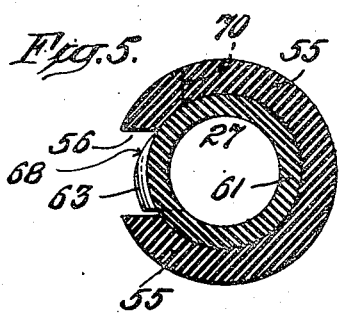
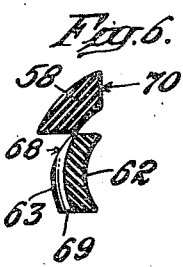
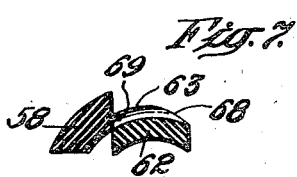
INVENTORS
ROLAND REPPERT
RUDOLPH A. JOHNSON
BY
English & Studwell
ATTORNEYS Patented Mar. 10, 1942

2,276,092

UNITED STATES PATENT OFFICE 2,276,092

CLOSURE FOR BATTERY BOX COVERS

Roland Reppert, Pelham Manor, and Rudolph A. Johnson, Brooklyn, N. Y., assignors to American Hard Rubber Company, New York, N. Y., a corporation of New York Original application April 9, 1940, Serial No. 328,608, now Patent No. 2,240,314, dated April 29, 1941. Divided and this application January 10, 1941, Serial No. 373,866

2 Claims. (Cl. 136—178)

The invention relates to an improvement in covers for battery boxes and other containers adapted to hold liquid at a predetermined level, the covers being provided with closure devices for permitting the introduction of liquid into the containers up to only the predetermined level and for thereafter permitting the escape to the atmosphere of gases generated in the liquid. More particularly, the invention is an improvement in battery box or other container-cover closure devices of the type provided with a vent cap and in which the act of removing the cap from the cover closes a vent passage so that the liquid introduced into the container rises to only the predetermined level and the placing of the cap on the cover opens the vent passage so that gas given off from the liquid may escape to the atmosphere. The present application is a division of our application Serial No. 328,608, filed April 9, 1940, issued as Patent No. 2,240,314, dated April 29, 1941.

One object of the invention is to provide an improved closure device in which the vent passage which communicates directly with or leads from the interior of the container is located in a valve seat with which cooperates a rotatable valve which is rotated by the vent cap—in one direction to close or cover the vent and in the opposite direction to uncover the vent—whereby the positive closing of the vent is assured when the cap is removed from the cover, and the positive uncovering of the vent is assured when the cap is applied to the cover to close the filling opening therein.

Another object of the invention is to provide a closure device of such construction that there is a choice of two filling openings, a relatively small opening and a relatively large one, the use of either of which for the time being excludes the use of the other. The smaller filling opening is located in the valve and is suitable for the occasional introduction of liquid into the container during the normal operation of the battery or other apparatus located in the container. The larger filling opening is located in a sleeve or the like in which the valve is adapted to be removably mounted, and (when not occupied by the valve), is for use at the manufactory during charging of the battery plates, emptying out the spent electrolyte and then refilling the container with fresh electrolyte. When the valve occupies the sleeve the larger opening cannot be used for filling purposes, but only the relatively small opening in the valve. Thus the present invention provides a large opening which facilitates the filling and emptying of the container during plate-charging operations, and a relatively small opening for the occasional filling or replenishing of the container as required during its normal operation, the advantages of this arrangement being pointed out further on in the detailed description of the valve and sleeve. Although removable from the sleeve, the valve cannot be displaced accidentally and can only be removed when turned to a certain position which the valve does not normally occupy during the usual liquid replenishing operations.

Other objects of the invention will appear as the description proceeds. To the accomplishment of these objects the invention consists in the improved container cover with the novel closure device hereinafter fully described and particularly pointed out in the appended claims.

In the accompanying drawing illustrating the invention, Fig. 1 is a vertical transverse section through a portion of the improved battery box cover with its novel closure device and showing the vent cap separated therefrom, the valve being in position closing the vent passage in the valve seat; Fig. 2 is a view similar to Fig. 1, but showing the vent cap connected with the cover and the valve in position uncovering the vent passage; Fig. 3 is a top plan view of the closure device with the vent cap removed and showing the valve in position closing the vent passage; Fig. 4 is a transverse section taken on the line 4—4 of Fig. 2, and showing the valve in position uncovering the vent passage; Figs. 5 and 6 are transverse sections taken on the lines 5—5 and 6—6, respectively, of Fig. 2; and Fig. 7 is a transverse section taken on the line 7—7 of Fig. 1.

The closure device of the present invention comprises a rotatable, annular valve which cooperates with an annular valve seat in which is located a vent passage which communicates directly with the interior of the container. The cooperating or working valve surfaces may be of any preferred cross-sectional contour, such as flat, conical or curved. For convenience of manufacture, the valve 10, as illustrated in the drawing, is a flat, flange or washer-like member which is seated upon a flat, annular valve seat 12 formed on the upper side of the top wall 15 of the improved battery box cover which may in general outline be of usual formation. In the valve 10 is formed an aperture 11 which extends through the thickness of the valve, and is shown as an arcuate notch in the periphery of the valve. Rising from the upper surface of the top wall 15 of the cover and concentrically surrounding the annular valve seat 12 is an internally threaded neck 16. Extending downwardly from the under surface 18 of the top wall 15 of the cover is a valve sleeve 55 which is concentric with annular valve seat 12. The annular valve seat 12 in function constitutes the upper end of the valve sleeve 55. At the junction of the valve sleeve 55 and the surface 18 is a shoulder 20.

Referring to Figs. 1, 2 and 3 it will be seen that the valve sleeve 55 is provided on one side throughout its length with a groove or slot 56 which passes entirely through the wall of the sleeve. At its upper end the slot 56 communicates with a vent passage 57 in the valve seat 12. The slot 56 is of the same width as the vent passage 57. Projecting downwardly from the lower end of the valve sleeve 55 is a stop lug 58. The side of the valve sleeve adjacent the lug 58 is slotted, as indicated at 59, so as to render the stop lug 58 flexible, that is to say, capable of being moved outwardly slightly and then returning to normal position.

The valve is provided with an unslotted tube 61 rotatably mounted in the sleeve 55. The lower extremity of the valve tube 61 limits the height to which the electrolyte can rise in the battery box, in other words, the lower extremity of the valve tube is in a plane substantially coincident with the predetermined level 21 of the electrolyte. The space 22 between the under or inner surfaces 18 of the cover and the electrolyte and surrounding the 61 and sleeve 55 receives the gases formed during the operation of the battery.

During the introduction of liquid into the battery box up to the predetermined level 21 of the electrolyte the space 22 is closed to the atmosphere and during the operation of the battery the space 22 is vented to the atmosphere. For this venting purpose the valve seat 12 is provided with the vent passage 57 which passes through the top wall 15 and leads into the space 22. This vent passage is adapted to be closed or open according to the position of the notch 11 of the valve 10. For convenience in molding, at the same time that the passage 57 is formed, there is formed the longitudinal slot 56 in the sleeve 55 and a groove 26 in the shoulder 20. It will be noted that the bottom of the groove 26 is flush with the under surface 18 of the top wall 15 of the cover. This arrangement serves the double function of permitting venting from space 22 as far as surface 18, and permitting all the liquid in the container to be emptied out when necessary by uncovering vent 57 and turning the container upside down.

At its lower end the valve tube 61 is provided with a downwardly projecting lug 62, the outer edge of which carries a key 63. The length of the key 63 is slightly less than the width of the vent passage 57 and of the slot 56. It will be seen that the extremity 65 of the unslotted valve tube 61 is on substantially the same plane as the electrolyte level 21. The top surface 66 of the key 63 is in a plane slightly below that of the lower edge 67 of the valve sleeve 55.

The valve 10 is turned in one direction to cover the vent passage 57 and in the opposite direction to uncover it, that is, to bring valve aperture 11 into registry with vent passage 57, by means of the vent cap 35, the lower tubular end 36 of which is reduced in size and is provided with an external thread adapted to screw into the internal thread in the neck 16 of the cover. The inner wall of the tubular part 36 of the vent cap is provided with an arcuate recess or slot 37 which, when the threaded part of the cap is placed in proper position in the mouth of the threaded opening in the cover, slips downwardly over and into driving engagement with the upper end of a stem or boss 38 rising from the upper surface of the valve 10.

It will be noted that the end 37a of the recess 37 is vertical whereas the other end 37b of the recess tapers or slopes downwardly and outwardly, and that the rounded end 38a of the boss 38, which corresponds to the vertical recess end 37a, is also vertical, whereas the end 38b of the boss and which corresponds to the sloping recess end 37b is also sloping. This construction permits the recess end 37a to stay in contact with the boss end 38a while the vent cap is being turned in clockwise direction to bring the threads on the cap into engagement with the threads in the neck 16 and the under surface 39 of the head of the cap against the upper end 40 of the neck 16 of the cover 14. On the other hand, if it is attempted to bring the first thread of the cap into the mouth of the threads in the cover by turning the cap in the counter-clockwise direction and the stop surface 69 encounters the stop lug 58 the tapered surface 37b of the recess 37 in the cap will ride up the slanting surface 38b of the boss 38 and so prevent attempt at further turning of the valve 10 in the counter-clockwise direction by means of the cap 35.

As the cap is turned in clockwise direction to bring the under surface 39 of the head of cap tightly against the upper edge 40 of the cover neck, the valve is thereby turned in the direction to bring the aperture 11 in the valve into registry with the vent passage 57, and when the cap is turned in counter-clockwise direction to unscrew it from the cover the valve is turned in the direction to cover the vent opening. In the upper part of the hollow interior of the vent cap is interposed a splash plate or diaphragm 41 with vent openings 42 at opposite edges. In the top of the cap is a vent hole 43.

It is necessary to the successful operation of the present type of closure device that when the vent cap is screwed down into final position in the cover there will be a free passageway leading from the gas-receiving space above the electrolyte to the vent hole in the cap, and that when the cap is removed from the cover the gas-receiving space be sealed from the atmosphere. Since the upper end of the neck of the cover constitutes a fixed stop for the cover, it is only necessary in the present closure device to arrange properly the relative positions of the boss 38 and notch 11 and their relative positions to the vent passage 57 to assure the registry of the notch 11 with the vent passage 57 when the cap is in the cover, as shown in Figs. 2 and 4.

The removal of the vent cap from the cover, as stated above, is effected by turning the cap in counter-clockwise direction and this movement causes the valve 10 to be turned to cover the passage 57, as shown in Figs. 1 and 3. In order that the cap may not be turned too far in the counter-clockwise or removal direction as to bring the notch 11 into registry with the vent passage 57 again, the lower end of the valve sleeve 55 is provided with the downwardly extending lug 58 which serves as a stop that is encountered by the flat-faced end 69 of the key 63 when the cap and the valve have been turned far enough in the counter-clockwise direction to close the passage 57, at or before which point the threads of the cap become disengaged from the threads of the neck of the cover, thereby permitting the cap to be removed so that liquid may be introduced into the battery box. In Figs. 3 and 7 the key 63 is shown abutting the stop 58 while the valve 10 is shown covering the vent opening 57.

By providing the key 63 with the cam surface 68 facing in the clockwise direction and slotting the lower end of the valve sleeve 55 so that the stop lug 58 will yield readily when the cam surface 68 of the key encounters edge of the stop lug and passes into engagement with the inner surface of the stop lug, the valve may be turned continuously in the clockwise direction. This is of advantage when replacing the vent cap on the cover after a filling operation. When the cap is removed from the cover at the point where the threads on the cap become disengaged from the threads on the cover, and the boss 38 is not moved during the filling operation, the cap may be readily replaced on the cover by simply bringing the recess 37 over the boss 38, that is, with the cap threads in registry with the mouth of the threads on the cover. It sometimes happens, however, that the boss 38 is moved during the filling operation, so that when the recess 37 is brought down over the boss 38 the first cap thread is not in registry with the mouth of the cover threads. The cap must now be turned in either direction to reach this point. It is undesirable that it be in continuous driving engagement with the boss 38 in the counter-clockwise direction owing to the fact that the stop lug 58 is in the path of the flat-faced end 69 of the key 63, since damage might ensue if the counter-clockwise turning force be too great. Hence the provision of the slanting surfaces 37b and 38b, preventing the counter-clockwise turning of the cap beyond this point, and hence the arrangement of the cam surface 68 and the resiliency of the stop lug 58 permitting the turning of the cap in the clockwise direction until the threads on the cap are in registry with the mouth of the cover threads.

To recapitulate briefly the mode of operation of the improved container cover with its novel closure device assembled as described above: Assuming the vent cap 35 to be in its ultimate position on the cover, as shown in Fig. 2, the gas generated during the operation of the battery rises from the electrolyte into space 22. It thence passes through the vent passage 57 into the tubular lower part of the vent cap, thence through the openings 42 and finally out through the vent hole 43. Should liquid be splashed upwardly through opening in the valve tube 61, or through vent passage 57, the diaphragm 41 will prevent it from passing out through the vent hole 43. When the battery requires more water, the vent cap is turned in the counter-clockwise or removal direction until the key 63 approaches or encounters the stop lug 58. This movement closes the vent passage 57 by the valve 10. The cap being removed, liquid is poured down the relatively small filling opening in the tubular valve tube 61 until it begins to rise therein. This indicates that the electrolyte has risen to its predetermined level 21. If the operator inadvertently pours in more liquid, the electrolyte cannot rise higher in the container than the level 21 because of the compression of the gases in the now air-tight space 22, although it can rise to the top of the neck 16. The vent cap is now screwed back into cover-closing position, thereby bringing the notch 11 into registry with the vent passage 57 and permitting any compressed gas in the space 22 to escape to the atmosphere. If surplus liquid had been poured into the battery box, even up to the rim of the neck 16, it will now subside and all the electrolyte be at a uniform level.

The valve tube 61 is assembled with the valve sleeve 55 by aligning the key 66 with the vent passage 57 and the slot 56 and then pushing the valve tube downwardly into the valve sleeve until the under or working surface of the valve 10 contacts with the valve seat 12. The upper surface 66 of the key 63 is now on a plane slightly below the lower end 67 of the valve sleeve. By turning the valve tube in the counter-clockwise direction the key 63 passes under the lower end 67 of the valve sleeve 55. Owing to the flexibility of the lower end or stop lug 58 of the valve sleeve 55, the cam surface 68 and key 63 will pass freely within the inner surface of the lug 58, whereby it will be understood that the valve tube 61 may be turned continuously in the clockwise direction. The turning of the valve tube in the counter-clockwise direction, however, is limited by the engagement of the end 69 of the key 63 with the end 70 of the lug 58. This arrangement is availed of so that when the valve is turned in the counter-clockwise direction during the removal of the cap 35 from the cover to close the vent passage 57, the valve cannot be turned far enough in the counter-clockwise direction to bring the aperture in the valve into registry with the vent passage 57 again. The removal of the valve tube 61 from the sleeve 55 is effected as follows: The vent cap having been removed, leaving the valve tube 61 in the position shown in Fig. 1, with the key 63 under the lower end 67 of the sleeve 55, the valve and tube are readily turned in the clockwise direction until the key 63 is in the lower end of the slot 56, whereupon the valve and tube may be withdrawn upwardly from the sleeve 55 to make available the relatively large filling opening afforded by the sleeve. It will be understood that the valve and sleeve, when normally in the position shown in Fig. 2 with the valve aperture 11 in registry with the vent passage, cannot be withdrawn from the sleeve because sealed in the cover by the vent cap. And also in the normal operation of refilling the container, the removal of the vent cap leaves the parts, as shown in Fig. 1 with the key 63 under the end 67 of the sleeve 55, thereby locking it in, until the unusual operation of manually (without the vent cap) turning the valve and tube in clockwise direction to position aligning the key 63 with the slot 56.

Having thus described the invention what we claim as new is:

1. A container cover having a top wall, a valve sleeve projecting downwardly from the under surface of the top wall with an opening extending therethrough, an annular valve seat formed in the upper surface of the top wall surrounding the upper end of the opening, there being a vent passage extending from the valve seat downwardly through the top wall, a rotatable annular valve seated on the valve seat for closing the vent passage and having an aperture therethrough arranged to register with the vent passage in one position of the valve, a tube carried by and extending downwardly from the under surface of the valve journaled in the sleeve and having an opening extending therethrough, the lower end of the sleeve having a downwardly projecting radially-yieldable stop lug, the lower end of the tube having an outwardly extending key adapted to engage with the under surface of the lower end of the sleeve, said key being relatively unyielding and having a cam surface facing in clockwise direction and a flat vertical stop surface facing in counter-clockwise direction, the arrangement being such that the valve may be turned continuously in the clockwise direction, the stop lug on the sleeve yielding outwardly to permit the key to pass by it, and in the counter-clockwise direction only to the point where the stop surface on the key encounters the stop lug on the sleeve, and means for turning the valve and tube.

2. A container cover having a top wall, a valve sleeve projecting downwardly from the under surface of the top wall with an opening extending therethrough, an annular valve seat formed in the upper surface of the top wall surrounding the upper end of the opening, there being a vent passage extending from the valve seat downwardly through the top wall, the valve sleeve having throughout its length a vertical slot communicating at its upper end with the vent passage, a rotatable annular valve seated on the valve seat for closing the vent passage and having an aperture therethrough arranged to register with the vent passage in one position of the valve, a tube carried by and having an unpierced wall throughout its length extending downwardly from the under surface of the valve journaled in the sleeve and having an opening extending therethrough, the lower end of the tube having a downwardly extending lug provided on its outer edge with a horizontal key less in length than the width of the slot in the sleeve, said key having a cam surface facing in clockwise direction and a flat vertical stop surface facing in counter-clockwise direction, the lower end of the sleeve having a downwardly projecting radially yieldable stop lug, the arrangement being such that the valve and tube may be turned continuously in the clockwise direction, the stop lug on the sleeve yielding outwardly to permit the key to pass by it, and in the counter-clockwise direction only to the point where the stop surface on the key encounters the stop lug on the sleeve, and means for turning the valve and tube.

ROLAND REPPERT.
RUDOLPH A. JOHNSON.